US006545813B1

(12) United States Patent
Matthies et al.

(10) Patent No.: US 6,545,813 B1
(45) Date of Patent: Apr. 8, 2003

(54) LENTICULAR LENS SHEET FOR PROJECTION SCREEN

(75) Inventors: Dennis Lee Matthies, Princeton, NJ (US); Wilber Clarence Stewart, Hightstown, NJ (US); Gerard Argant Alphonse, Princeton, NJ (US)

(73) Assignee: Thomson Licensing S.A., Boulogne Cedex (FR)

( * ) Notice: Subject to any disclaimer, the term of this patent is extended or adjusted under 35 U.S.C. 154(b) by 0 days.

(21) Appl. No.: 09/786,580

(22) PCT Filed: Jun. 20, 2000

(86) PCT No.: PCT/US00/16927

§ 371 (c)(1),
(2), (4) Date: Mar. 2, 2001

(87) PCT Pub. No.: WO01/02882

PCT Pub. Date: Jan. 11, 2001

Related U.S. Application Data

(63) Continuation of application No. PCT/US00/16927, filed on Jun. 20, 2000.
(60) Provisional application No. 60/142,285, filed on Jul. 2, 1999.

(51) Int. Cl.[7] .......................... G02B 27/10; G03B 21/60
(52) U.S. Cl. ................... 359/622; 359/456; 359/457; 359/619; 359/627
(58) Field of Search ............................... 359/619, 622, 359/627, 452, 456, 457

(56) References Cited

U.S. PATENT DOCUMENTS 4,418,986 A * 12/1983 Yata et al. ................... 359/457
4,468,092 A * 8/1984 Inoue et al. .................. 359/457
4,469,402 A 9/1984 Yata et al. .................... 359/457
4,561,720 A * 12/1985 Clausen et al. .............. 359/457
4,767,186 A * 8/1988 Bradley, Jr. et al. ......... 359/452
4,927,233 A * 5/1990 Nakanishi et al. ........... 359/456
5,428,476 A 6/1995 Jensen et al. ................ 359/457
6,097,539 A * 8/2000 Clausen ....................... 359/456
6,304,378 B1 * 10/2001 Clausen ....................... 359/456

FOREIGN PATENT DOCUMENTS

EP        361 918 A  *  4/1990  ............ G03B/21/62
WO       97 35228 A  *  9/1997  ............ G03B/21/62

* cited by examiner

*Primary Examiner*—Georgia Epps
*Assistant Examiner*—Gary O'Neill
(74) *Attorney, Agent, or Firm*—Joseph S. Tripoli; Joseph J. Laks; Sammy S. Henig

(57) ABSTRACT

A lenticular screen component of a rear projection display screen has lenticular elements formed on a viewer surface. Identical lenticular elements cover the entire lenticular screen component and are repeated horizontally at a constant displacement. A given lenticular element includes a pair of reflective side portions and a refractive tip portion interposed between the side portions. One of the pair of side portions forms a sloped region at a joint between the one side portion and a side portion of an adjacent lenticular element. The sloped region is at an angle in a range between 5 and 15 degrees with respect to the first axis. The one side portion is covered with a reflective coating in at least a region of the one side portion that includes the joint. The pair of reflective side portions reflects light rays incoming from a projector towards the refractive tip portion for refracting the reflected light rays via a surface of the refractive tip portion facing a viewer. Each refracted light ray is refracted by a convex surface of the refractive tip portion.

11 Claims, 4 Drawing Sheets

LENTICULAR LENS SHEET FOR PROJECTION SCREEN

This application claims the benefit under 35 U.S.C. §365 of International Application PCT/US00/16927 filed Jun. 20, 2000, which was published in accordance with PCT Article 21(2) on Jan. 11, 2001 in English, and which claims the benefit of U.S. Provisional Application Ser. No. 60/142,285, filed Jul. 2, 1999.

BACKGROUND OF THE INVENTION

The invention relates to a projection screen of a display device.

A rear projection television includes, for example, a projection type cathode ray tube (CRT) in which an image is formed. The formed image is projected via a projection lens on a rear projection screen. The rear projection screen provides a surface on which a final image is displayed for viewing. The rear projection screen redirects a diverging cone of light from the projection lens into a limited range of directions encompassing the locations of intended viewers, thereby providing a gain in image brightness. The rear projection screen also reduces reflections of ambient light that lower the contrast of the displayed image.

Rear projection screens generally include a Fresnel lens component for directing the light and a separate, lenticular lens component for producing the angular spreading of the light. The Fresnel screen component functions as a single large field lens that collects light from the projector and redirects the light so that it reaches the lenticular screen component approximately collimated. Therefore, the focal length of the Fresnel lens is determined by the requirement for collimated light and the optical distance to the projector. The Fresnel screen component can be formed from a sheet of clear optical material and is placed in contact with the projector side of the separate lenticular screen component.

Rear projection screens can be classified by the primary way that is used to spread the light after it has been redirected by the Fresnel lens component. The three categories are diffusive, refractive, and reflective/refractive. Diffusive structures consist of random patterns of small surface features and/or lightscattering particles distributed in the volume of the light-spreading lenticular lens. Refractive structures are formed of small lens like surface features that are carefully specified, and/or replicated in one or two dimensions at a well-defined pitch. Such lenticular arrays introduce a periodic spatial sampling of the projected image that can, disadvantageously, form moire beats with the projected pixels or with the Fresnel lens structure.

A typical lenticular screen component of a rear projection display has lenticular elements formed on a viewer surface. Identical lenticular elements cover the entire lenticular screen component and are repeated horizontally at a constant displacement. The lenticular elements vary in height only in a horizontal direction across the screen; there is no variation along the vertical direction through any given horizontal location. A given lenticle or lenticular element linearly spans the entire height of the lenticular screen component, without variation, from the top edge to the bottom edge. A given lenticular element has a pair of reflective sides and a lens section between the sides. The lenticular element changes the light direction by a combination of reflection and refraction. Reflectance occurs primarily at the sides of the lenticular elements that are reflective. Refraction takes place at the lens section where the light exits toward the viewer.

A lenticular lens component of a projection screen, embodying an inventive feature, includes lenticular elements. Each lenticular element extends in a vertical or a height direction and repeats in a horizontal or a width direction to form a plane defining a first axis normal to the plane. The given lenticular element includes a pair of reflective side portions and a refractive tip portion interposed between the side portions. One of the pair of side portions forms at a joint between the one side portion and a side portion of an adjacent lenticular element a sloped region at an angle in a range between 5 and 15 degrees with respect to the first axis. The one side portion is covered with a reflective coating in at least a region of the one side portion that includes the joint. The pair of reflective side portions reflects light rays incoming from a projector towards the refractive tip portion for refracting the reflected light rays via a surface of the refractive tip portion facing a viewer. Each refracted light ray is refracted by a convex surface of the refractive tip portion.

A trapping structure for ambient light is provided between the lenticular elements. Scattering structures are provided on the projector side surface (and/or within the interior of the volume).

SUMMARY OF THE INVENTION

A lenticular lens of a projection screen, embodying an inventive feature, includes a plurality of lenticular elements. Each lenticular element extends in a first direction and repeated in a second direction to form a plane defining a first axis normal to the plane. A given lenticular element includes a refractive tip portion and a pair of reflective side portions. The side portions have the refractive tip portion interposed between a pair of end edges thereof, respectively. At least one of the pair of side portions has a joining edge in common with a side portion of an adjacent lenticular element and has a sloped region that includes the common joining edge. The sloped region forms an angle smaller than 15 degrees with respect to the first axis. The one side portion is covered with a reflective coating at least in the sloped region that includes the common joining edge. The pair of reflective side portions reflect light rays incoming from a projector towards the refractive tip portion for refracting the reflected light rays via a surface of the refractive tip portion facing a viewer. Each refracted light ray from the tip portion is refracted by a convex surface.

DETAILED DESCRIPTION OF THE PROFFERED EMBODIMENTS

Figure 1:
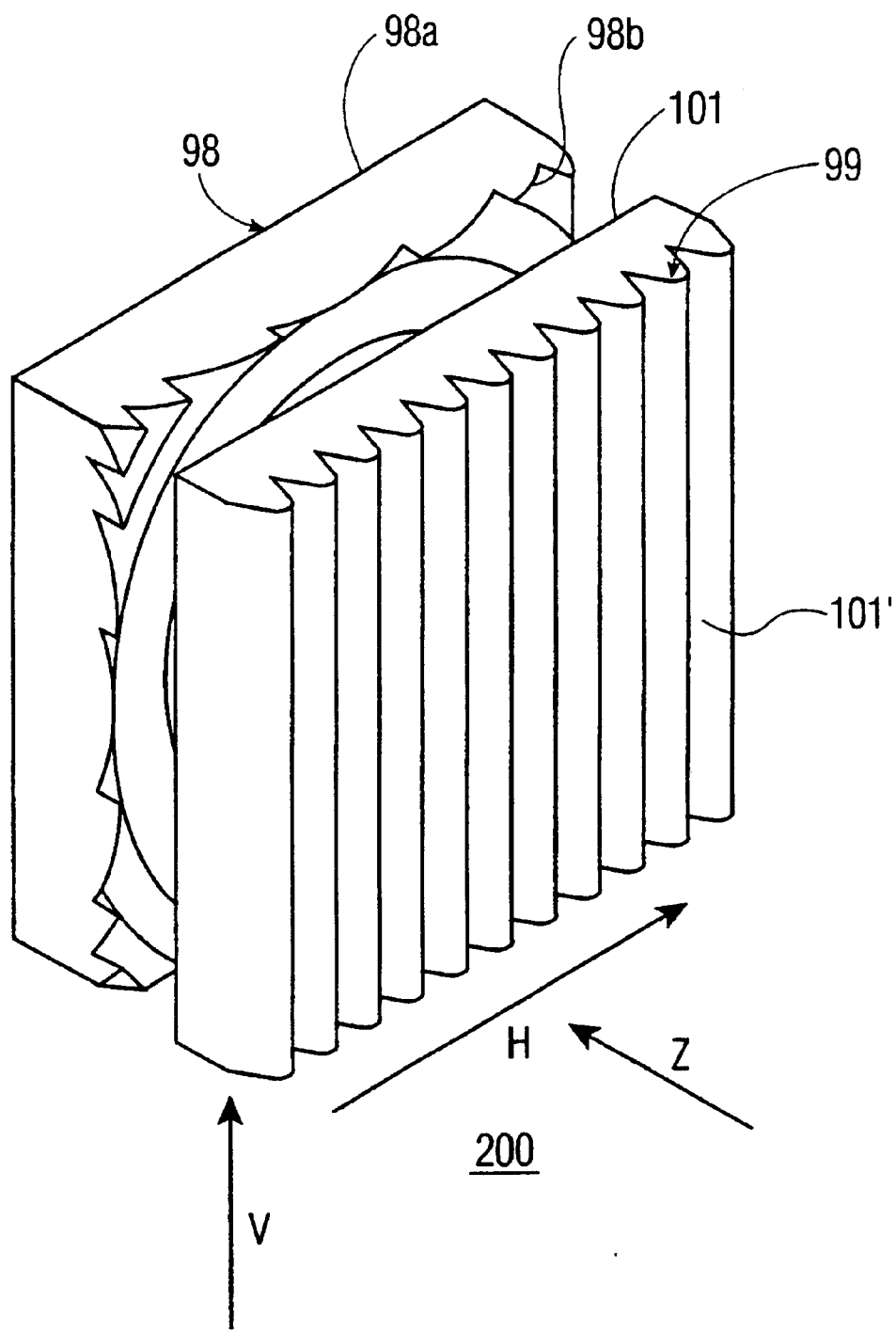
FIG. 1 illustrates a rear projection screen, embodying an inventive feature, that includes a Fresnel screen component and a lenticular screen component.

FIG. 1 illustrates a rear projection screen 200 that includes a conventional Fresnel screen component 98 having a side 98a facing a projector that includes, for example, a CRT, not shown. A lenticular screen component 99, embodying an inventive feature, has a base surface 101 that may be relatively flat facing a side 98 of Fresnel screen component 98. An opposite surface 101' of lenticular screen component 99 faces a viewer. An axis Z is normal or perpendicular both to surface 101 and to the average surface of opposite surface 101'. Lenticular screen component 99 may be formed of a polymer material. Projected image light rays are applied via Fresnel lens component 98 of FIG. 1 at approximately normal incidence to surface 101 of lenticular screen component 99.

Figures 2A, 2B:
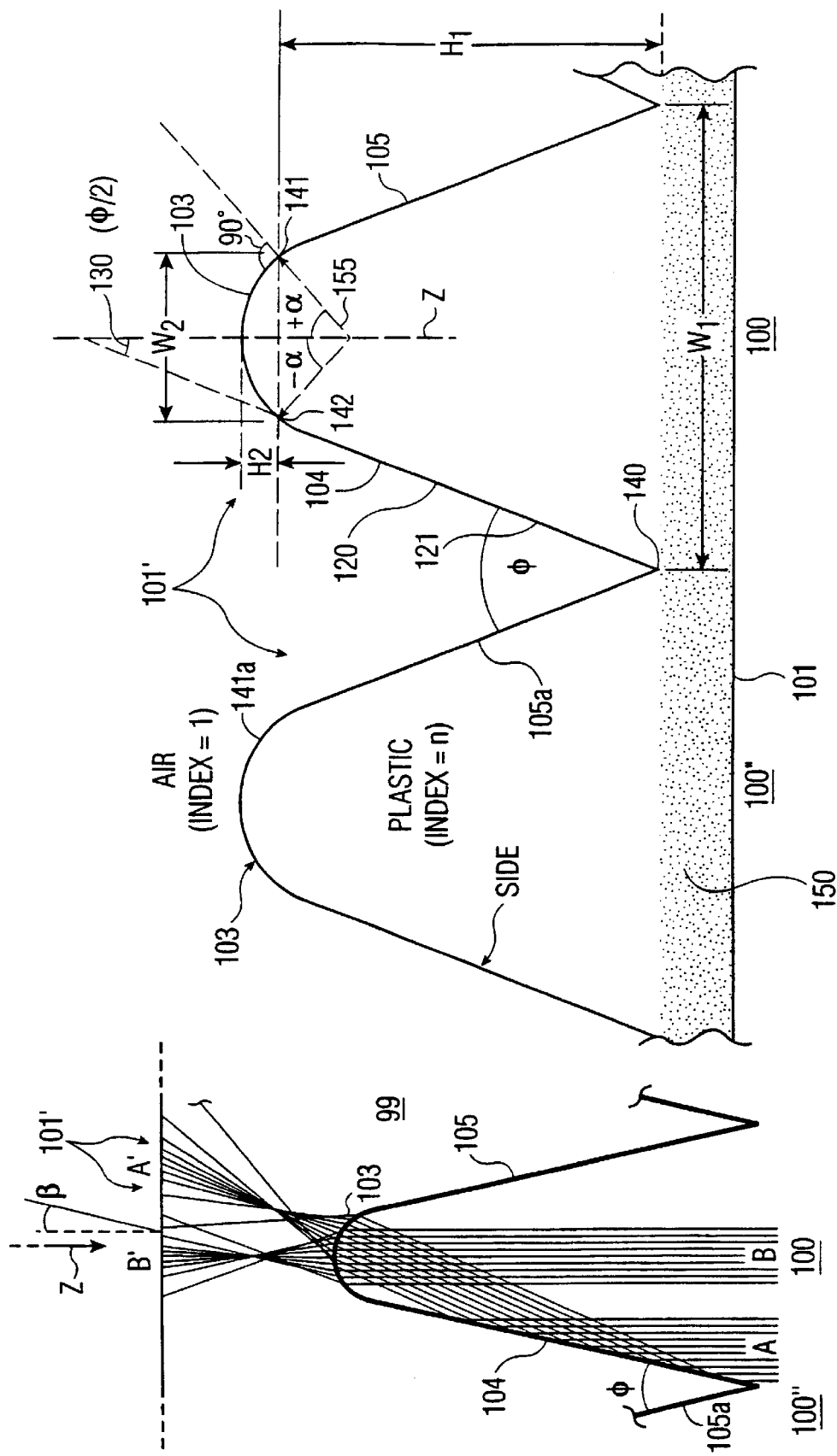
FIG. 2a illustrates in a simplified manner light paths within a lenticular element of the lenticular screen component of FIG. 1.
FIGS. 2b and 2c illustrate in a simplified manner the structure and operation of the lenticular element of FIG. 2a and an adjacent lenticular element.
Figure 2C:
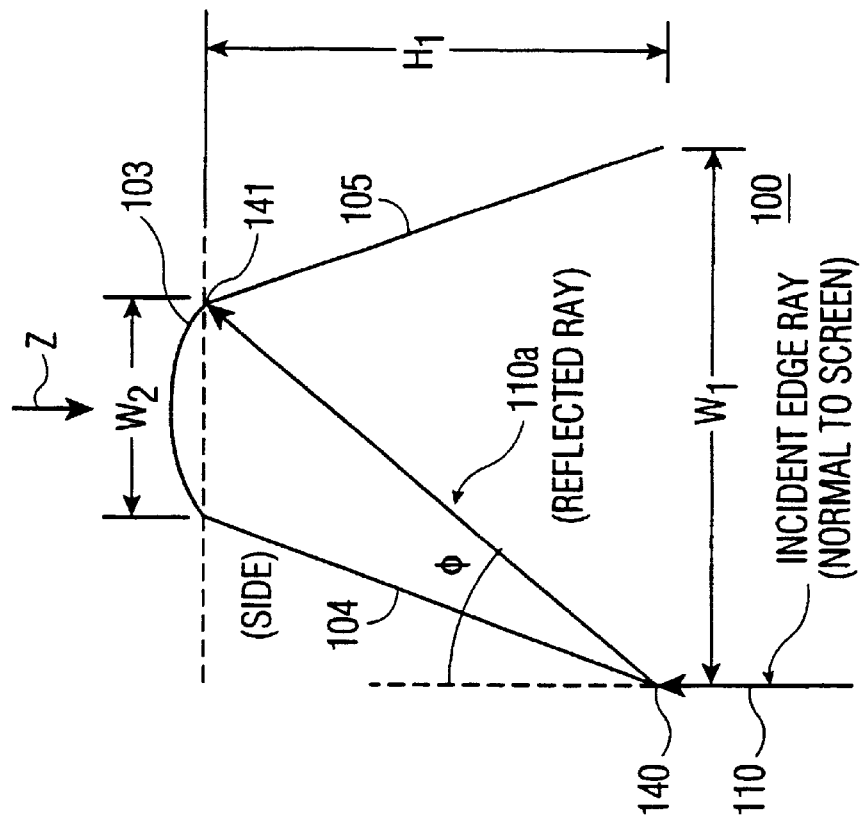

FIG. 2a illustrates in a simplified manner light paths within a lenslet or lenticular element 100, embodying an inventive feature, of lenticular screen component 99 of FIG. 1. FIGS. 2b and 2c illustrate in a simplified manner the structure and operation of lenticular elements 100 of FIG. 2a and an adjacent lenticular element 100''. Similar symbols and numerals in FIGS. 1, 2a, 2b and 2c indicate similar items or functions.

Figure 3A:
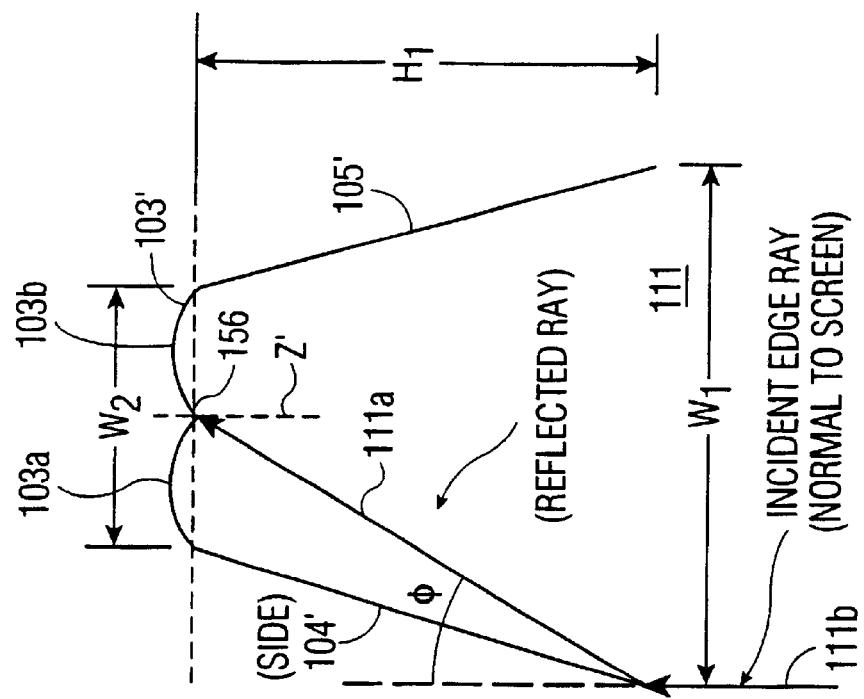
FIGS. 3a and 3b illustrate in a simplified manner the structure and operation of a second embodiment of the lenticular element of the lenticular screen component of FIG. 1.

Each lenticular element, such as, for example, lenticular element 100 of FIG. 2b extends in a vertical or height direction V and repeated in a horizontal or width direction H of FIG. 1 at a constant displacement W1 of FIG. 2b or 3a. Constant displacement W1 is called the pitch of lenticular screen component 99 of FIG. 1. For comparison purposes, a pitch of Fresnel screen component 98, that is similarly defined, is preferably less than 75% of the pitch of lenticular screen component 99.

Lenticular element 100, for example, of FIG. 2b, includes a pair of reflective sides 104 and 105. An angle $\phi$ is formed between side 104 and a side 105a of an adjacent lenticular element 100''. A lens tip section 103 having a continuously curved convex outward shape is interposed between reflective sides 104 and 105, at the tips of the lenticular profile, between an end edge 142 and an end edge 141, respectively. Tip section 103 has a width W2. A distance between an end edge 141a of a side 105a of an adjacent lenticular element 100'' and end edge 142 of lenticular element 100 has a value equal to the difference W1−W2.

A first portion of the incoming rays from the projector, not shown, denoted by a ray bundle B in FIG. 2a, intercepts tip section 103 mainly directly and to a smaller extent indirectly as a result of reflection. The rays of ray bundle B are refracted upon exiting lenticular screen component 99, and spread horizontally into a corresponding angular ray fan B' that is symmetrical about normal axis Z. An angular extent of ray fan B' is determined by a range of surface slopes associated with the specific curvature of the surface of tip section 103. An angle $\beta$ provides a measure of the angle at which the angular density of the refractive rays falls to approximately one-half the density at the center of ray fan B'.

A second portion of the incoming rays, denoted by a ray bundle A, is reflected by reflective left side 104 of lenticular screen component 99. These rays are horizontally deviated by angle $\phi$, where $\phi$ is an included angle between side 104 and a side 105a of adjacent lenticular element 100'' at the point of reflection. When the deflected rays reach tip section 103 between reflective side 104 and a reflective side 105, some rays exit lenticular element 100, and some are prevented from exiting by total internal reflection in the lens region, not shown. Those rays that exit form a ray fan A', centered around an axis, not shown, at a clockwise angle of +$\phi$ relative to normal axis Z. The density of rays in fan A' typically changes from maximum to one-half its maximum value over an angle comparable in the magnitude to angle $\beta$ in fan B'.

A reflective coating 120 of FIG. 2b for reflecting ray bundle A of FIG. 2a is placed between edge 140 and edge 142 of side 104 of FIG. 2b. Reflective coating 120 is preferably applied in a thin conformal coating. Coating 120 can be a reflective metal, for example, silver, aluminum or chromium. Alternatively, the required reflectivity can be achieved by total internal reflection. Because of the steepness of sides 104 and 105 of lenticular elements 100, total internal reflection will occur if sides 104 and 105 of lenticular element 100 are coated with at least one optical wavelength thickness of a low index material.

An index of refraction, $n_c$, of low index coating 120 preferably satisfies the condition $n_c < n \cdot \sin(\text{theta})$ where n is the refractive index of lenticular element 100. Theta is an angle of side 104, for example, relative to plane 101 lenticular screen component 99, minus the characteristic spreading angle of scattering structure 150, referred to later on. Theta has a value that is close to 90−$\phi$/2.

A third portion of the incoming rays, not shown, enters element 100 at its base surface 101 in a similar manner and reaches side 105 of lenticular element 100. In the third portion of the incoming rays, not shown, a ray at a given distance to the right of normal axis Z of lenticular element 100, is a mirror image of the ray in bundle A at the same distance to the left of normal axis Z. Thus, a third fan of rays, not shown, exits lenticular element 100 with a leftward angular displacement of $\phi$. Rays in the third fan of rays, not shown, form a mirror image of those in ray fan A', both in position and angle.

Angled or sloped sides 104 and 105, for example, of lenticular element 100 of FIG. 2b extend a height H1 from joint edge 140, where sides 104 and 105a are joined. Angled sides 104 and 105 are capped by continuously curved tip section 103 having the width W2. Sides 104 and 105 of lenticular element 100 can be either straight or curved.

A light path of a ray 110 is incident at a left edge 140 of base surface 101 of FIG. 2a in a direction parallel to screen normal axis Z of FIG. 2c. Edge ray 110 is reflected from sloping side 104 of lenticular element 100 at an angle equal to $\phi$ with respect to screen normal axis Z, where $\phi$ is the included angle between adjacent sides 104 and 105. Reflected edge ray 110a, preferably, reaches tip section 103, located above dotted horizontal line in FIG. 2c, at extreme right hand edge 141 of curved tip section 103. This geometrical relationship is expressed mathematically by:

$$H_1 = (W_1 + W_2)/2 \tan(\phi) \qquad (1\text{-}1)$$

When a first condition, expressed by equation 1-1, is satisfied, all the rays at lenslet base surface 101 of FIG. 2a, that are parallel to screen normal axis Z and directed toward sloping left side 104, will be, advantageously, reflected. Advantageously, such reflected rays would reach to all positions along the width direction of curved tip section 103. Incident rays that are parallel to screen normal axis Z represent the average direction of rays that have traversed Fresnel lens component 98 of FIG. 1 and a diffusing structure 150 of lenticular screen 99.

In carrying out an inventive feature, side portions 104, for example, has joining edge 140 in common with side portion 105a of adjacent lenticular element 100'' and is sloped, at least in a region that includes common joining edge 140 to form angle 130. Angle 130 is in a range between 5 and 15 degrees. The range of angle 130 is equal to one-half of angular range $\phi$, defining the slope. The region that includes joining edge 140 is covered with a corresponding portion of a reflecting coating 120. Advantageously, edge ray 110 of FIG. 2c would reach tip section 103. On the other hand, a ray, not shown, that is slightly to the left of ray 110, would be reflected to reach the corresponding tip section 103 of the adjacent lenticular element, not shown in FIG. 2c. Thereby, efficient reflective coating 120 is obtained.

Preferably, the slope of reflective side 104 at all points between edges 140 and 142 should lie within angular range 130, between approximately 5 degrees and approximately 15 degrees. If angular range 130 defining the slope (at any point) of side 104, for example, were too large, too much of the light from the projector would have experienced multiple reflections and, disadvantageously, would not have escaped through lens section 103. On the other hand, if angular range 130 were too small, then it would have been difficult to fabricate the structure. This is so because plastic molding processes require a relief angle in order that the plastic can be removed from the mold.

Height H1 of side 104 or 105 of FIG. 2b plus a height H2 of convex lens tip section 103 together determine a total height of lenticular elements 100. The aspect ratio of lenticular element 100 is defined as a ratio between the total height and the pitch of lenticular elements 100.

A length of side 104 or 105 is preferably selected to be sufficient for the reflective light to span the entire width of lens section 103, but not so large that significant amount of light undergoes a second reflection from the opposite side. This condition, in conjunction with the aforementioned requirement that angular range 130 be between approximately 5 degrees and approximately 15 degrees, requires a rather large aspect ratio in a range from approximately 1.5 to approximately 3.0.

Angles between screen normal axis Z and each of normal axes to the surface of curved tip section 103, such as a normal axis 155, span a range of angles ±α. Positive angles α are measured clockwise from screen normal axis Z. The radius of curvature of tip section 103 need not be constant.

A second condition for the preferred geometry relates to the magnitude of angle α at edge 141 of lens tip section 103 of FIG. 2b. Angular range ±α across convex tip section 103 is made greater than approximately 30 degrees that is, advantageously, large enough to provide adequate light spreading in the horizontal direction.

Geometrical considerations dictate that an angle 141b, formed between a tangent 141a at edge 141 and side 105, is equal to 90 degrees +α+ϕ/2. The value of a is greater than 30 degrees, as explained before. The value of angle α/2, that is equal to angular range 130, lies between 5 and 15 degrees, as explained before. Thus, the value of angle 141a is larger than (90 degrees +30 degrees+5 degrees=125 degrees).

Reflected edge ray 110a of FIG. 2c, reflected from edge 140 of side 104, intercepts at edge 141 of lens section 103. In order that reflected edge ray 110a be refracted most sharply to the left by curved tip section 103, the relative angle |ϕ−α| between ray 110a and corresponding normal 155, preferably should be as close as possible to the critical angle for the lens medium. This can be expressed mathematically as:

$$\alpha + \phi \sin^{-1}(1/n), \quad (1\text{-}2)$$

where n is the refractive index of the lens medium. A Lenticular element 100 that meets the above mentioned first and second conditions will spread normally incident light, advantageously, over the largest range of angles.

A consequence of equation 1-1 is that for values of ratio H1/W1 larger than about 3/2, tip width W2 is approximately one-third of total lenslet width W1. This means that approximately one-third of the incident light flux is reflected from left side 104 before proceeding to curved tip section 103, one-third reaches tip section 103 directly without reflection, and the remaining third is reflected from right side 105. Thus three fans of output rays are formed with approximately equal levels of light flux. Fan of rays A' of FIG. 2a reflected from left side 104 will exit lens section 103 with a rightward angular bias. The fan of rays, not shown, reflected from right side 105 will have a leftward angular bias. The fan of non-reflected rays B' will be symmetrically redistributed about screen normal axis Z. Taken together, the three fan of rays provide, advantageously, a continuous distribution of luminance that monotonically decreases with increasing horizontal angle from screen normal axis Z.

In carrying out an inventive feature, coating 120 of FIG. 2b is applied at least at a boundary or joint region that includes base edge 140, between side 104 of lenticular element 100 and side 105a of lenticular element 100".

Thereby, advantageously, ray 110 of FIG. 2c will contribute to the refracted light from lens section 103. However, it may be desirable to apply coating 120 to all portions of lenticular element 100 surface, exclusive of tip section 103, that are not used for the refractive spreading of light.

The refraction action of tip section 103 is made by a surface that is convex everywhere between sides 104 and 105 of lenticular element 100.

Thereby, each ray reflected from side 104 or 105 intercepts the convex surface of tip section 103. The refraction action of the convex surface of tip section 103 causes the light intensity to be, advantageously, more uniform at each viewing angle than if any portion of the surface of tip section 103 were not convex.

A light trapping structure located at a region 121 is preferably formed on top of coating 120 of sides 104 and 105 of lenticular element 100, on surface 101' facing the viewer. Light trapping structure 121 is formed by a light absorbing material that is conformally coated on the viewer side of the reflective coating on sides 104 and 105 of lenticular element 100. Because of the presence of reflective coating 120, advantageously, neither the absorptivity nor the index of refraction of this absorbing material affects the transmission of projected light through lenticular element 100.

The absorption efficiency is particularly high because the aforementioned use of preferred range of side angle 130 produces a deep, concave upward surface on which the material can be coated. Ambient light that reaches the light trapping from the viewer side will typically experience several partial reflections, with significant loss of intensity at each reflection, before returning toward the viewing space. Thus, light trapping structure at region 121 absorbs ambient light efficiently.

Absorption efficiency is also high because the percentage of the area of the viewer side surface occupied by the light trap is high, typically 40% to 60%. In comparison, screens that use a black matrix stripe (matrix coatings are approximately planer, partially absorbing coatings) reflect the ambient light back to the viewer after only one reflection. Therefore, the blackness of coating on light trapping structure at region 121 is not as critical as with conventional screens with black matrix coatings. This is so because of the occurrence of multiple surface encounters. Advantageously, light trapping structure at region 121 also reduces the ambient light reflection to the viewer more efficiently than conventional screens that use a tinted absorbing material in the plastic.

In carrying out another inventive feature, scattering structure 150 introduces a controlled angular distribution to light passing through lenticular screen component 99. A preferred location of scattering structure 150 is on surface 101 facing the projector, not shown. Scattering structure 150 on surface 101 includes a shallow relief modulation, either random or in a pattern. Alternatively, minute scattering structures 150 could be incorporated in the bulk of lenticular component 99, or surface and bulk effects can be combined.

Scattering structure 150, in the absence of lenticular element 100 on exit surface 101', preferably, should be capable of diffusing light from the projector, not shown, that arrives normal to the screen through angles of approximately 8 degrees to approximately 12 degrees from screen axis Z. The diffused light distribution typically exhibits circular symmetry about axis Z, with substantially equal intensity at all azimuthal angles, and at least diffuses light in the vertical direction.

Scattering structure 150 serves three distinct functions. Firstly, it provides sufficient angular spreading of the projected light away from screen axis Z in vertical direction V, so that the viewed image will not exhibit a localized "hot spot". Secondly, scattering structure 150 improves contrast by dispersing internal reflections from surface 101 of the projector side of the ambient light that enters viewing side 101' of lenticular screen component 99. Thirdly, scattering structure 150 suppresses moire artifacts caused by periodic sampling of the incident light pattern by the periodic lenticular elements, such as lenticular element 100, on viewing surface 101' of lenticular screen component 99.

All of the incident light passes through scattering structure 150 before exiting lenticular element 100. One effect of the scattering is a horizontal deflection in a direction H of FIG. 1 of the collimated incoming rays into a distribution whose density drops by approximately to one-half within an angular deflection defined as ±δ, not shown.

The relatively small horizontal deflections from scattering structure 150 typically produce negligible changes to the distribution of horizontal deflections occurring further in the light path of lenticular element 100. Stray light that is not on a first pass from the projector to lenticular screen component will typically enter lenticular element 100 at angles larger than ±δ, and exceed the acceptance angle for eventual interception by tip section 103. The stray light is eventually absorbed after multiple reflections at side 104 or 105 of lenticular element 100, or is reflected back to base surface 101 of lenticular element 100.

In carrying out an inventive feature, lenticular screen component 99 has a balance of side angle 130, refractive strength of tip section 103, and scattering strength of scattering structure 150 such that the following three conditions are simultaneously satisfied: 2β≅φ; 3β=horizontal viewing angle requirement; δ=vertical viewing angle requirement. In addition, the thickness of lenticular screen component 99 is selected such that light dispersed by scattering structure 150 suppresses the moire beat pattern of light that is due to the sampling of lenticular screen component 99 and Fresnel screen component 98. The useful range of thickness for lenticular screen component 99 is approximately 5 to 10 times the constant displacement having the value W1 between, for example, adjacent lenticular elements 100 and 100", referred to as the pitch of lenticular screen component 99. In addition, the pitch of lenticular screen component 99 is selected to be less than approximately one-half the resolution requirement of the projection system.

Advantageously, lenticular screen component 99 provides wide viewing space in horizontal direction H (e.g., greater than ±45 degrees), and narrow viewing space in a vertical direction V (e.g., ±8 to ±12 degrees). In addition, the resulting image is relatively free of moire artifacts.

Figure 3B:
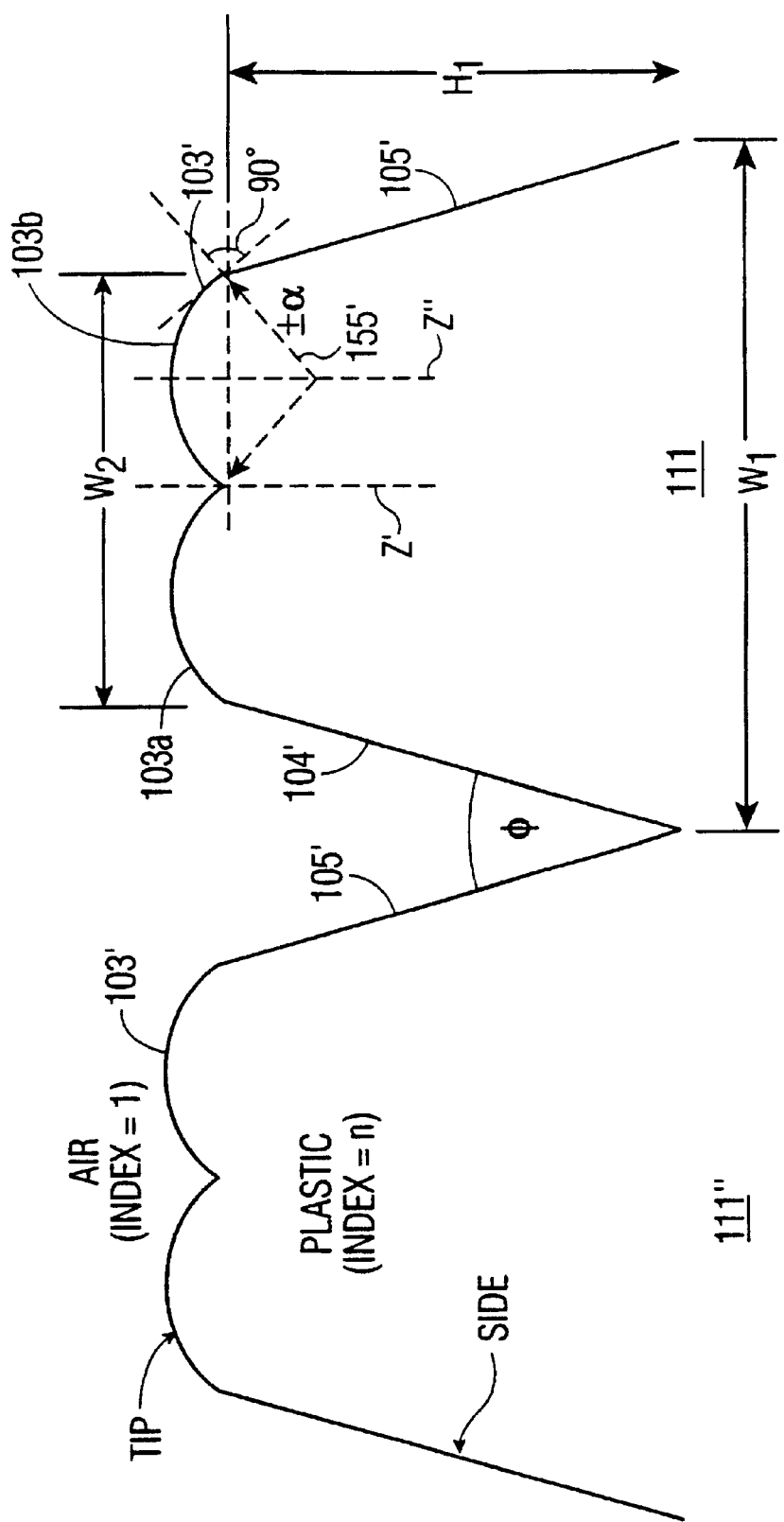

FIGS. 3a and 3b illustrate in a simplified manner the structure and operation of a second embodiment of a lenticular element 111 analogous to lenticular element 100 of FIG. 2a or 2b. In FIG. 3b an adjacent lenticular element 111" that is analogous to lenticular element 100" of FIG. 2b is also shown. Similar symbols and numerals in FIGS. 1, 2a, 2b, 2c, 3a and 3b indicate similar items or functions.

In FIG. 3b, a double lens tip section 103 has a curved tip surface formed from a pair of portions 103a and 103b that are displaced laterally and symmetrically about a center axis Z' of the lenslets. Similar to the arrangement of FIG. 2b, the width of lenticular element 111 at its base is W1, while the total curved tip section occupies a width W2. Included angle φ is measured between the facing sides 104' and 105' of adjacent lenticular elements 111 and 111".

Assume that the same geometrical restrictions defined by equations 1-1 and 1-2 are imposed on the embodiment in FIG. 3a, and that portions 103a and 103b were formed as half-scale replicas of tip section 103 in FIGS. 3a and 3b. Therefore, the distribution of the output ray directions would have been the same as in the arrangement of FIGS. 2a and 2b, because the angular distribution of surface normals 155' encountered at tip section 103 in FIG. 3b would be the same.

However, it may be desirable to have a reflected edge ray 111a in FIG. 3a reach tip section 103' at a center point 156 of the lenticular element 111 on normal axis Z'. From this condition, the following expression is derived:

$$H_1 = W_1/2 \, \tan(\phi) \qquad (2\text{-}1)$$

In the arrangement of FIG. 3a, incident rays, such as ray 111b, that are parallel to screen normal axis Z' and reflect from side 104' or 105' of lenticular element 111, will span the full width of only a corresponding one of portions 103a and 103b. Thus, reflected ray 111 a span the full width of only portion 103a. The maximum angle a of surface normals 155' in lens section 103' of FIG. 3b is related to angle φ between sloping sides 104' and 105' in the same manner expressed before in equation 1-2.

The introduction of double-lobed tip section 103' of FIG. 3a has three, advantageous consequences:

1. In cases where a larger portion of the output flux in the central fan of rays, such as the ray fan, not shown, that is analogous to ray fan B of FIG. 2a is desirable, the arrangement of FIGS. 3a and 3b provides design flexibility.

2. For a given value of angle φ between adjacent sides 104' and 105' of FIGS. 3a and 3b, the ratio $H_1/W_1$ is somewhat reduced in comparison to that in the arrangement of FIGS. 2a and 2b. Equivalently, for a given ratio $H_1/W_1$, angle φ between adjacent sides 104' and 105' of FIGS. 3a and 3b can, be reduced. The resulting ratio $W_2/W_1$ in the arrangement of FIGS. 3a and 3b is closer to the value 1/2 then to the value 1/3, obtained in the arrangement of FIGS. 2a–2c.

3. For viewing positions near screen normal Z' located at a center of lenticular screen component 99 of FIG. 1, where the light distribution is dominated by rays that have not been reflected from sloping sides 104' and 105' of FIGS. 3a and 3b, each lenticular element, such as lenticular element 111, forms a pair of closely spaced samples of the projected image at a lateral separation of $W_2/2$. An advantageous consequence of this double sampling by lenticular element 111 is the cancellation of any potential moire beat from a collinear periodic pattern of pitch $W_2$. The arrangement of FIGS. 3a and 3b enables the design of a rear projection screen system where the ratio of the lenticular and Fresnel pitches is 2:1.

What is claimed is:

1. A lenticular lens of a projection screen, comprising:
a plurality of lenticular elements, each extending in a first direction and repeated in a second direction to form a plane defining a first axis normal to said plane, a given lenticular element including:
  a refractive tip portion; and
  a pair of reflective side portions having said refractive tip portion interposed between a pair of end edges thereof, respectively, at least one of said pair of side portions has a joining edge in common with a side portion of an adjacent lenticular element and has a sloped region that includes said common joining edge forming an angle smaller than 15 degrees with respect to said first axis, said one side portion being covered with a reflective coating at least in said sloped region that includes said common joining edge, said one side portion having also a joining edge in common with a corresponding one of said end edges of said tip portion and forming an angle larger than 125 degree with respect to a tangent to said tip portion at said common edge of said tip and said one side portions, said pair of reflective side portions reflecting light rays incoming from a projector towards said refractive tip portion for refracting said reflected light rays via a surface of aid refractive tip portion facing a viewer such that each refracted light ray from said tip portion is refracted by a convex surface.

2. A lenticular lens according to claim 1, wherein said convex surface defines a range of angles having an absolute value greater than 30 degrees between said first axis and each axis normal to said convex surface.

3. A lenticular lens according to claim 1, wherein said convex surface of said refractive tip portion is formed by a plurality of surface portions, each of said plurality of surface portions defining a range of angles having an absolute value greater than 30 degrees between said first axis and a corresponding axis normal to said each surface portion.

4. A lenticular lens according to claim 1, wherein said reflective coating comprises a thin conformal reflective coating.

5. A lenticular lens according to claim 1, wherein said reflective coating covers a surface of said side portion facing the viewer.

6. A lenticular lens according to claim 1, further comprising a light trapping structure made of a light absorbing material that is approximately conformally coated on a viewer side of said reflective coating facing a viewer.

7. A lenticular lens according to claim 1, wherein said reflective coating has at least one optical wavelength thickness of a low index material.

8. A lenticular lens according to claim 1, further comprising a light scattering structure provided on a surface of said lenticular element facing the projector side and being capable of spreading in a vertical direction collimated light from the projector 8 to 12 degrees off an axis of the collimated light.

9. A lenticular lens according to claim 1, further comprising a light scattering structure provided in a bulk of said lenticular lens and being capable of spreading in a vertical direction collimated light from the projector 8 to 12 degrees off an axis of the collimated light.

10. A lenticular lens of a projection screen, comprising:
a plurality of lenticular elements, each extending in a first direction and repeated in a second direction to form a plane defining a first axis normal to said plane, a given lenticular element including:
  a refractive tip portion for refracting light rays incoming from a direction of a projector; and
  a pair of side portions having said refractive tip portion interposed between a pair of end edges thereof, respectively, at least one of said pair of side portions has a joining edge in common with a side portion of an adjacent lenticular element and has a slope region forming an angle smaller than 15 degrees with respect to said first axis covered with a light absorbing conformal coating for absorbing light rays incoming from a direction of a viewer, said one side portion, having also a joining edge in common with a corresponding one of said end edges of said tip portion and forming an angle larger than 125 degree with respect to a tangent to said tip portion at said common edge of said tip and said one side portions the tip portion at the common edge of tip and the one side portions.

11. A lenticular lens according to claim 10 wherein a portion of said light rays incoming from the direction of the viewer is absorbed in said light absorbing conformal coating via multiple reflection paths.

* * * * *